US011872925B2

(12) United States Patent
Negrin

(10) Patent No.: US 11,872,925 B2
(45) Date of Patent: Jan. 16, 2024

(54) SELF-PROPELLED VEHICLE FOR HANDLING GLASS-SHEET SUPPORTING RACKS

(71) Applicant: ITALCARRELLI S.P.A., Chiampo (IT)

(72) Inventor: Alessandro Negrin, Chiampo (IT)

(73) Assignee: ITALCARRELLI S.P.A., Chiampo (IT)

( * ) Notice: Subject to any disclaimer, the term of this patent is extended or adjusted under 35 U.S.C. 154(b) by 384 days.

(21) Appl. No.: 17/355,328

(22) Filed: Jun. 23, 2021

(65) Prior Publication Data

US 2021/0402909 A1 Dec. 30, 2021

(30) Foreign Application Priority Data

Jun. 24, 2020 (IT) .................. 102020000015211

(51) Int. Cl.
*B60P 3/00* (2006.01)
*B60P 7/10* (2006.01)

(52) U.S. Cl.
CPC ............... *B60P 3/002* (2013.01); *B60P 7/10* (2013.01)

(58) Field of Classification Search
CPC .... B60P 3/002; B60P 7/10; B60P 3/00; B60P 1/02
See application file for complete search history.

(56) References Cited

U.S. PATENT DOCUMENTS

| 4,385,856 A * | 5/1983 | O'Neal | B60P 3/002 |
| | | | 105/377.01 |
| 4,666,181 A * | 5/1987 | Wegner | B62D 53/062 |
| | | | 280/43.23 |
| 2022/0258660 A1* | 8/2022 | Negrin | B60P 1/027 |

FOREIGN PATENT DOCUMENTS

| EP | 3 260 357 | 12/2017 |
| EP | 3 342 636 | 7/2018 |

\* cited by examiner

*Primary Examiner* — Brian D Nash
(74) *Attorney, Agent, or Firm* — Leason Ellis LLP

(57) ABSTRACT

A self-propelled vehicle for handling glass-sheet supporting racks of the type comprising: a front rack-supporting chassis provided with a substantially U-shaped rigid oblong frame having two longitudinal beams that extend horizontally and parallel to the longitudinal axis of the vehicle, on opposite sides of the vehicle midplane, and that delimit a large central slit or compartment open at the front and dimensioned to accommodate a glass-sheet supporting rack; a rear tractor unit which is firmly connected to the front rack-supporting chassis via mechanical means allowing the rack-supporting chassis to move vertically with respect to the tractor unit; a lifting apparatus Adapted to vary, on command, the height from the ground of the rigid oblong frame of the rack-supporting chassis; and an electronic vehicle-load detecting apparatus which is adapted to detect the geometric and/or structural features of the glass-sheet supporting rack during insertion into the central slit or compartment of the rack-supporting chassis.

16 Claims, 3 Drawing Sheets

SELF-PROPELLED VEHICLE FOR HANDLING GLASS-SHEET SUPPORTING RACKS

CROSS-REFERENCE TO RELATED APPLICATIONS

This patent application claims priority from Italian patent application no. 102020000015211 filed on Jun. 24, 2020, the entire disclosure of which is incorporated herein by reference.

TECHNICAL FIELD

This invention relates to a self-propelled vehicle for handling glass-sheet supporting racks.

More specifically, the present invention relates to a self-propelled transporter for handling glass-sheet supporting racks suitable to accommodate large glass sheets. Use to which the following description will make explicit reference without however losing generality.

BACKGROUND ART

As is known, self-propelled transporters for handling glass-sheet supporting racks are usually made up of a large front rack-supporting chassis and a rear tractor unit, integral with each other and both provided with ground-resting wheels.

In addition, the self-propelled transporters have a hydraulically-operated lifting system, which is able to vary the height of the rack-supporting chassis from the ground on command, while always keeping the chassis parallel to itself and to the ground.

In particular, the rack-supporting chassis basically consists of an oblong, U-shaped rigid structure that extends horizontally so as to form, straddling the midplane of the vehicle, a large, straight horizontal slit which is long and wide enough to accommodate a whole glass-sheet supporting rack and is open at the front so as to allow the entry of the glass-sheet supporting rack.

Two idle ground-resting wheels are located at the front ends of the two longitudinal beams of the chassis, while the rear part of the rack-supporting chassis is firmly attached to the tractor unit by means of a coupling system that allows the front rack-supporting chassis to vary its height above the ground, moving freely with respect to the tractor unit in a vertical direction while always remaining parallel to itself.

The rear tractor unit, on the other hand, is provided with a pair of ground-resting driving and steering wheels, an engine unit adapted to drive into rotation the driving and steering wheels, and a driver's cab that is designed to accommodate the vehicle driver and has, inside itself, the steering wheel and other control elements necessary for driving the transporter.

Unfortunately, the handling of the glass-sheet supporting racks is strongly influenced by the dimensions and arrangement of the glass sheets on the glass-sheet supporting rack, so that the driver of the self-propelled transporter has to pay attention to a myriad of factors when approaching, picking up, blocking, moving and, finally, laying down a glass-sheet supporting rack.

Driving the vehicle is moreover made more problematic by the fact that the overall length of a glass-sheet supporting rack can be up to 9 metres, and the driver's cab is located at the rear of the self-propelled transporter with the operational limitations that this entails.

The driver, in fact, is located more than ten metres away from the front of the self-propelled transporter and is often unable to perceive the dimensions of the glass-sheet supporting rack and the load at the front of the vehicle.

DISCLOSURE OF INVENTION

Aim of the present invention is to provide a self-propelled transporter for handling glass-sheet supporting racks that can simplify the driving of the vehicle and make the handling of the glass-sheet supporting racks safer.

In accordance with these aims, according to the present invention there is provided a self-propelled vehicle for handling glass-sheet supporting racks as defined in claim 1 and, preferably though not necessarily, in any one of the claims dependent thereon.

BRIEF DESCRIPTION OF THE DRAWINGS

This invention will now be described with reference to the accompanying drawings, which illustrate a non-limiting embodiment thereof, wherein:

FIG. 3 is perspective view of the lower part of the self-propelled vehicle shown in FIG. 1, with parts removed for clarity's sake; whereas

BEST MODE FOR CARRYING OUT THE INVENTION

Figure 1:
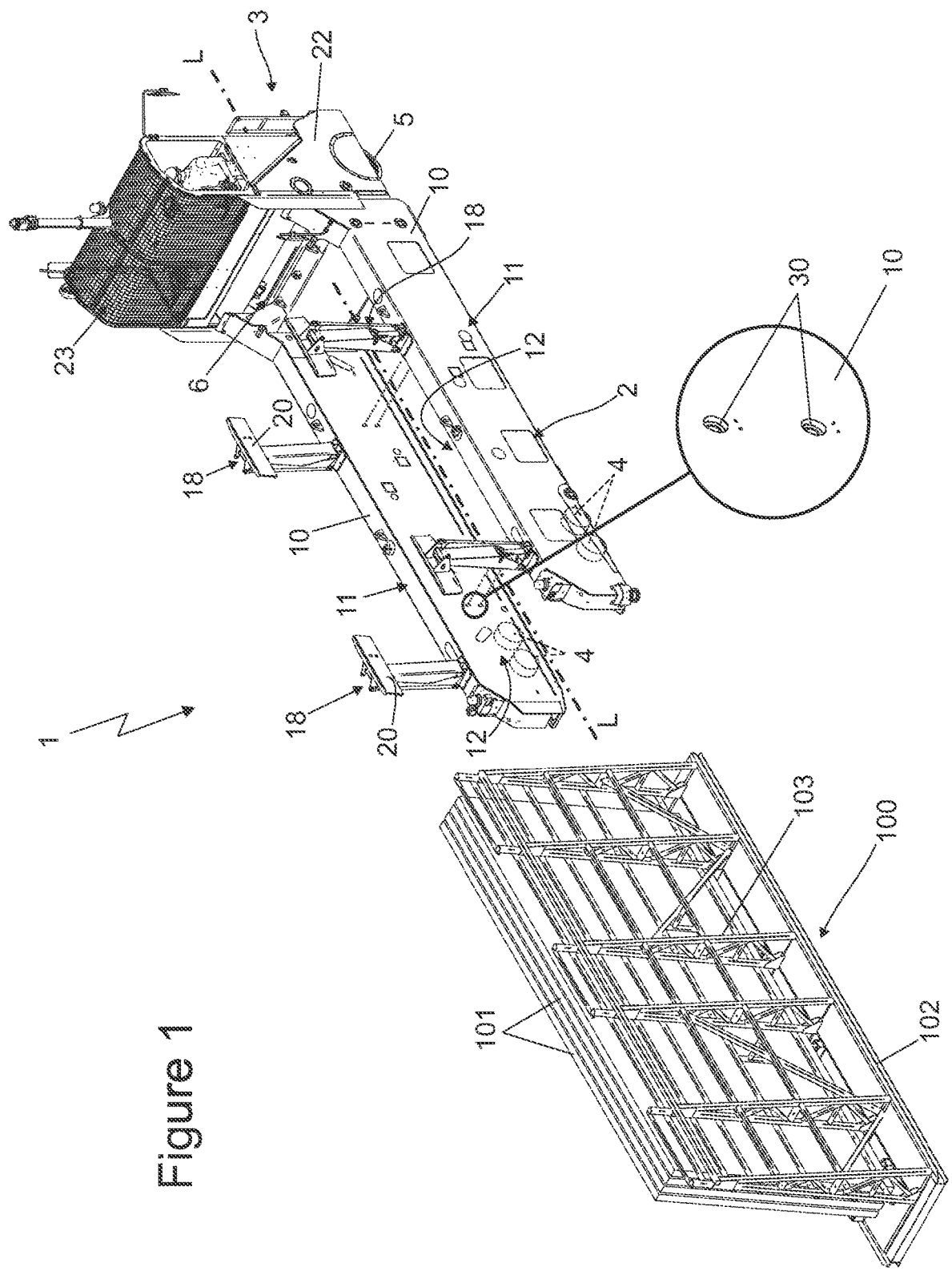
FIG. 1 is a perspective view of a self-propelled vehicle for handling glass-sheet supporting racks realized according to the teachings of the present invention.
Figure 2:
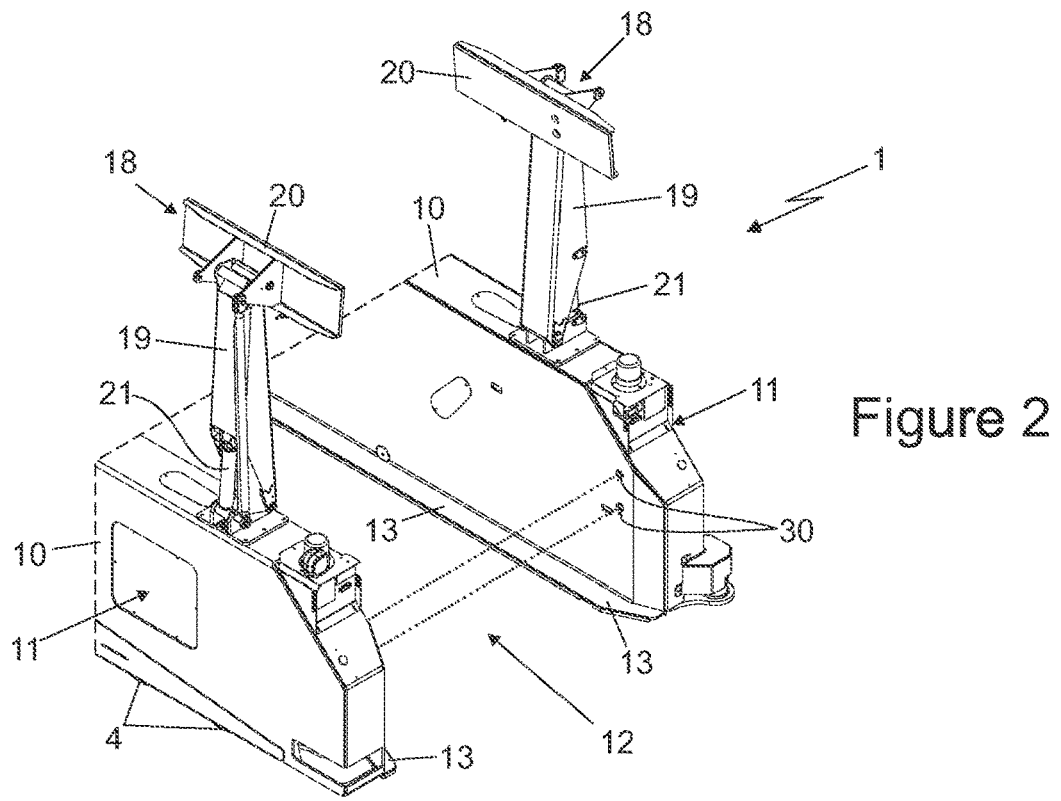
FIG. 2 is a perspective view of the front of the self-propelled vehicle shown in FIG. 1, with parts removed for clarity's sake.
Figure 3:
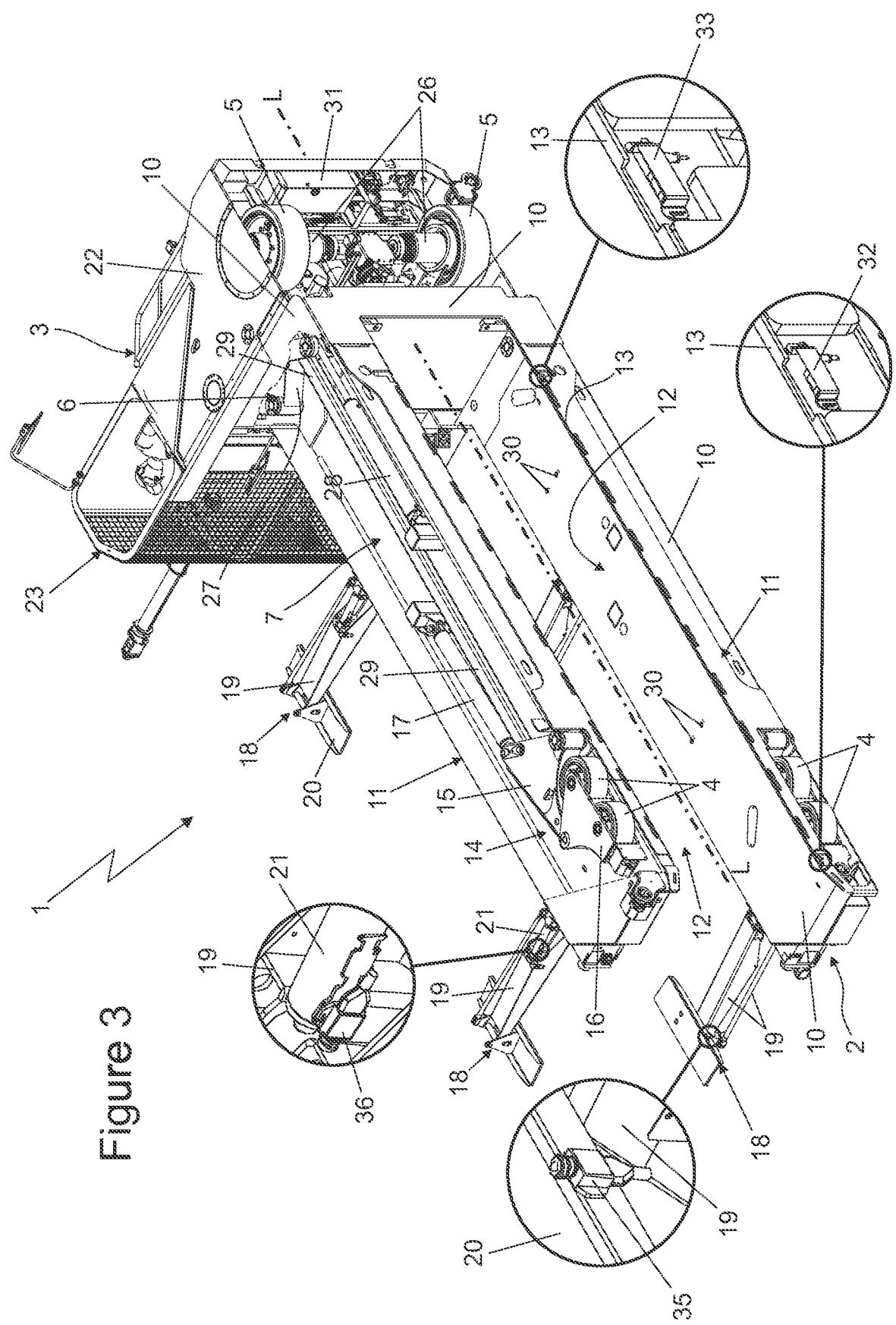

With reference to FIGS. 1, 2, and 3, number 1 denotes, as a whole, a self-propelled vehicle specifically structured for handling individual glass-sheet supporting racks 100 of known type and specifically structured to accommodate and support large glass or marble sheets or packs of glass or marble sheets.

In addition, the self-propelled vehicle 1 can also be advantageously used to safely handle loading platforms suitable for supporting metal plates and other large items.

More specifically, the self-propelled vehicle 1 is particularly adapted to handle glass-sheet supporting racks 100 of known type, preferably having an A-shaped or L-shaped structure, which are specifically dimensioned to support a variable number of glass sheets 101 with a length preferably ranging between 6 and 10 meters, arranged one adjacent the other in a basically vertical position.

In other words, the self-propelled vehicle 1 is structured so as to be able to fork, lift, move horizontally, and, finally, lay back down on the ground a glass-sheet supporting rack 100 suitable for supporting glass sheets 101 with a length preferably ranging between 6 and 10 meters.

With reference to FIGS. 1 and 3, the self-propelled vehicle 1 is provided with a plurality of ground-resting wheels and is longitudinally subdivided into a front rack-supporting chassis 2 and a rear tractor unit 3, which are aligned one after the other along the vehicle longitudinal axis L and are stably connected to each other.

More specifically, the front rack-supporting chassis 2 is structured so as to couple with a glass-sheet supporting rack 100, and has at least one pair of ground-resting wheels 4 that are arranged near the front end of the vehicle substantially coaxial with each other, on opposite sides of the vehicle vertical midplane M, preferably in a substantially specular position with respect to the same midplane. Preferably the wheels 4 are moreover idle and arranged parallel to the midplane M.

In the example shown, in particular, the front rack-supporting chassis 2 preferably provided with two pairs of ground-resting wheels 4, arranged in proximity of the front end of the vehicle, on opposite sides of the vehicle vertical midplane M in a substantially specular position with respect to the same midplane M.

The rear tractor unit 3, on the other hand, is provided with at least one pair of driving and preferably also steering, ground-resting wheels 5 that are arranged on opposite sides of the vehicle vertical midplane M, preferably in a substantially specular position with respect to the same midplane M.

Preferably the self-propelled vehicle 1 is, therefore, provided with at least two front ground-resting wheels 4 and at least two rear ground-resting wheels 5, placed in pairs on opposite sides of the vehicle midplane M, substantially at the vertices of a rectangle or an isosceles trapezoid.

With reference to FIG. 3, the rear tractor unit 3, in addition, is firmly and stably connected to the rack-supporting chassis 2 via a mechanical coupling with one degree of freedom, which keeps the rack-supporting chassis 2 and the rear tractor unit 3 always aligned with each other, straddling the vehicle midplane M, and at the same time enables the rack-supporting chassis 2 to freely move with respect to rear tractor unit 3 in a substantially vertical direction, i.e. orthogonally to the vehicle longitudinal axis L, while remaining always parallel to itself.

More in detail, the rear tractor unit 3 is preferably firmly connected to the front rack-supporting chassis 2 via a swinging arm linkage 6 (only partially visible in the figures) that allows the rack-supporting chassis 2 to move freely with respect to the tractor unit 3 in a vertical direction, while always remaining parallel to itself and straddling the midplane M.

In addition, the self-propelled vehicle 1 is moreover provided with a preferably hydraulically- or pneumatically-operated, lifting apparatus 7 which is adapted to vary/adjust, on command, the height of the rack-supporting chassis 2 with respect to the ground.

With reference to FIGS. 1, 2, 3, and 4, in particular, the rack-supporting chassis 2 comprises a substantially U-shaped, rigid oblong frame 10, preferably made of metal material, which extends substantially parallel to the ground, i.e. horizontally, and has two long longitudinal prongs or beams 11 that extend substantially horizontally and parallel to the vehicle longitudinal axis L, in a substantially specular position on opposite sides of the vehicle midplane M.

The back of the rigid oblong frame 10 is connected to the tractor unit 3 via the mechanical coupling with one degree of freedom, or rather to the swinging arm linkage 6, while the ground-resting wheels 4 are preferably located substantially at the front/distal ends of the two longitudinal prongs or beams 11.

The lifting apparatus 7 is adapted to vary/adjust, on command, the height of the rigid oblong frame 10 from the ground, while keeping the two longitudinal prongs or beams 11 always substantially parallel to themselves and/or to the ground.

More specifically, the lifting apparatus 7 is adapted to vary, on command, the height from the ground of the rigid oblong frame 10 between a maximum value preferably exceeding 30 cm (centimetres), and a minimum value (see FIG. 4) in which the rigid oblong frame 10 is substantially flush with the ground.

With reference to FIGS. 1, 2, and 3, the two longitudinal beams 11, in addition, form/delimit between themselves a big oblong and straight central slit or compartment 12, which extends parallel to the vehicle longitudinal axis L, substantially straddling the vehicle vertical midplane M, is open at the front, and is dimensioned so as to accommodate a glass-sheet supporting rack 100.

In other words, the central compartment 12 has a width that preferably over-approximates the nominal width of the glass-sheet supporting racks 100, so as to be slidingly engaged by a glass-sheet supporting rack 100 arranged parallel to the vehicle longitudinal axis L.

In the example shown, in particular, the central compartment 12 has a length preferably ranging between 8 and 12 meters and/or a width preferably ranging between 1 and 2 meters and optionally equal to about 1.5 meters.

In addition, each longitudinal beam 11 is moreover structured to couple to a corresponding longer lateral side of the base 102 of glass-sheet supporting rack 100 engaging the central slit or compartment 12, so as to be able to support/prop up the glass-sheet supporting rack 100 when the rigid oblong frame 10 is at its maximum distance from the ground.

Figure 4:
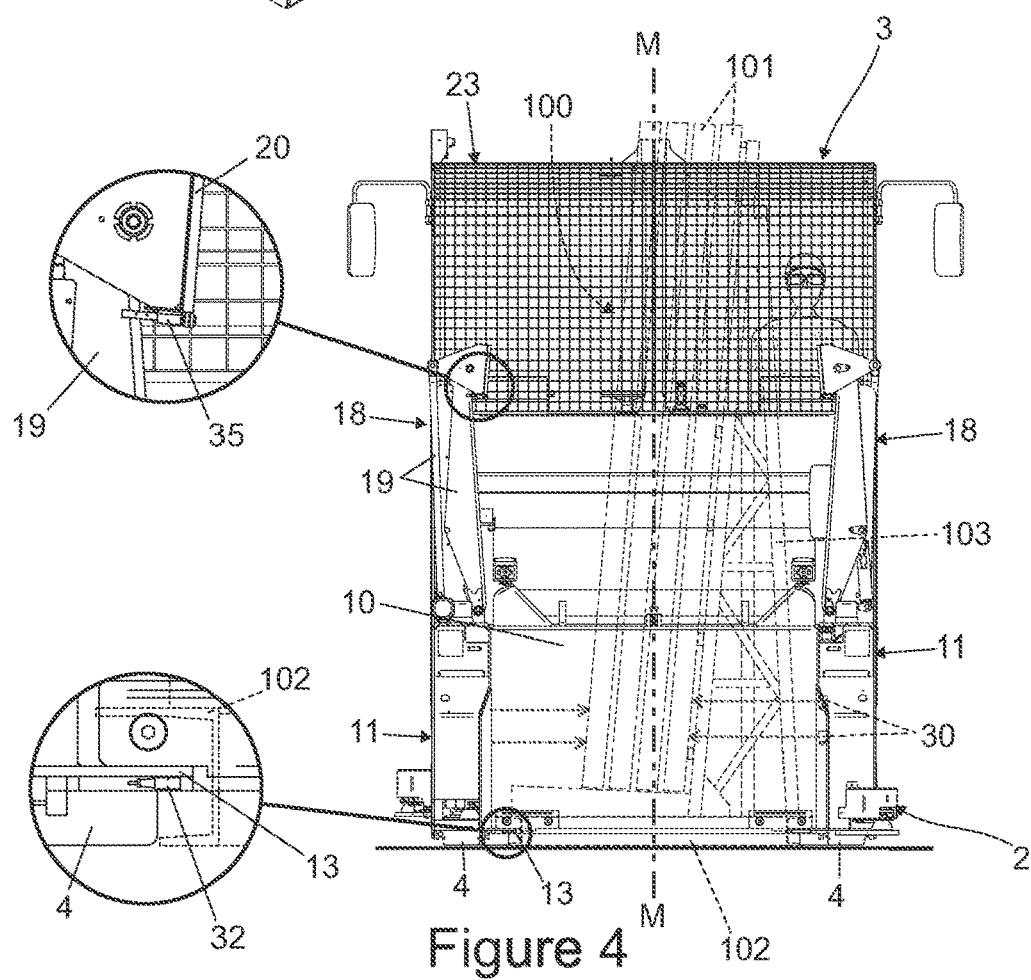
FIG. 4 is a front view of the self-propelled vehicle shown in FIG. 1, during operation and with some parts removed for clarity's sake.

More specifically, with reference to FIGS. 2, 3, and 4, both longitudinal prongs or beams 11 of the rigid oblong frame 10 are preferably provided, close to the lower edge, with one or more protruding longitudinal blades or shelves 13 that extend cantilevered inside the central slit or compartment 12 while remaining substantially parallel to the ground, i.e. substantially horizontal, and are adapted to slide underneath the longer lateral sides of the base 102 of the glass-sheet supporting rack 100, so as to support the entire glass-sheet supporting rack 100 when the rigid oblong frame 10 is lifted and brought to the maximum distance from the ground.

Preferably the projecting blades or shelves 13 of the two longitudinal beams 11 are moreover substantially coplanar with each other.

In other words, the rigid oblong frame 10 is structured so as to fork the base 102 of a glass-sheet supporting rack 100 oriented parallel to the vehicle longitudinal axis L, while slide coupling with the base 102 of the glass-sheet supporting rack 100.

With reference to FIG. 3, preferably each ground-resting wheel 4 or group of ground-resting wheels 4 is moreover fixed/connected to the corresponding longitudinal beam 11 via a swinging-arm suspension 14, which is preferably accommodated inside the same longitudinal prong or beam 11.

More specifically, each ground-resting wheel or group of ground-resting wheels 4 is fixed to the end of a swinging arm 15 that is preferably rocker-arm pivoted to the longitudinal prong or beam 11, preferably near the distal end of the same prong, so as to be able to rotate about a transversal and horizontal rotation axis, i.e. substantially perpendicular to the vehicle vertical midplane M.

In the example shown, in particular, each group of wheels 4 is fixed in axially rotatable manner to a small subframe 16 that, in turn, is hinged to the free end of the swinging arm 15.

The rack-supporting chassis 2 is thus provided with two swinging arms 15 that are preferably arranged in a substantially specular position on opposite sides of the vertical midplane M, and are rocker-arm pivoted to the two longitudinal prongs or beams 11, so as to separately rotate/swing about a same transversal rotation axis, while remaining both locally substantially parallel to the vertical midplane M.

With reference to FIG. 2, in addition to the swinging arm 14, each swinging-arm suspension 15 additionally comprises a single or double-acting hydraulic or pneumatic cylinder 17, which is preferably interposed between the swinging arm 15 and the body of the longitudinal beam 11, and is capable of varying the inclination of the swinging arm 15 with respect to the vertical.

The lifting apparatus 7 is adapted to command the hydraulic- or pneumatic-cylinders 17 of the two swinging-arm suspensions 14 so as to control/vary the inclination of the swinging arms 15 with respect to the vertical and, thus, to adjust, on command, the height of the distal end of the two longitudinal prongs or beams 11 of the rack-supporting chassis 2 from the ground.

With reference to FIGS. 1, 2, 3, and 4, the rack-supporting chassis 2 is preferably also provided above with at least one pair of movable load-locking arms 18, which are cantilever mounted over the two longitudinal prongs or beams 11 of the rigid oblong frame 10, on opposite sides of the vehicle midplane M, and are able to move, on command and each in relation to the corresponding longitudinal prong or beam 11, to and from the vehicle vertical midplane M, so as to bring their distal end in abutment against the load of the glass-sheet supporting rack 100 momentarily accommodated in the central slit or compartment 12.

More in detail, each movable load-locking arm 18 preferably extends cantilevered upwards from the upper part of the corresponding longitudinal prong or beam 11 of the rigid oblong frame 10, and is preferably pivoted to the same longitudinal prong or beam 11 so as to be able to swing to and from the vehicle vertical midplane M, while remaining on a plane substantially vertical and substantially perpendicular to the vehicle vertical midplane M.

The two movable load-locking arms 18 are moreover substantially coplanar to each other and are swinging movable over a common lying plane.

In other words, the two movable load-locking arms 18 lie and are swinging movable over a same vertical plane that is orthogonal to the vehicle midplane M.

In the example shown, in particular, the rack-supporting chassis 2 is preferably provided with a number of pairs of movable load-locking arms 18, suitably spaced along the entire length of the two longitudinal prongs or beams 11 of rigid oblong frame 10.

In addition, each movable load-locking arm 18 preferably comprises: an articulated-parallelogram structure 19 pivoted onto the upper part of the longitudinal prong or beam 11; a plate-like head 20 attached to the distal end of the articulated-parallelogram structure 19; and a single or double-acting hydraulic or pneumatic cylinder 21, which is preferably interposed between the body of the longitudinal beam 11 and the articulated-parallelogram structure 19, and is able to push/tilt, on command, the articulated-parallelogram structure 19 towards the vehicle midplane M, so as to bring the plate-like head 20 in abutment against the load of the glass-sheet supporting rack 100 momentarily accommodated into the central slit or compartment 12.

With reference to FIGS. 1, 3, and 4, the tractor unit 3 in turn comprises: a bodywork or supporting frame 22 to which the ground-resting wheels 5 are fixed, preferably in a vertically pivoting or swivelling manner; an engine apparatus that is placed on the bodywork or supporting frame 22, and is adapted to drive into rotation the rear ground-resting wheels 5; a steering assembly (not visible in the figures) that controls the orientation/tilt of the rear ground-resting wheels 5 with respect to the bodywork 22 and the vehicle longitudinal axis L; and a driver's cab 23 that is dimensioned to accommodate the vehicle driver (i.e. the person driving the self-propelled vehicle 1) and preferably internally accommodates the steering wheel, the throttle or accelerator that controls the rotating speed of the rear ground-resting wheels 5, the manually-operated control elements that control the movement of the various movable load-locking arms 18, and/or the other manually-operated control elements necessary for driving the self-propelled vehicle 1.

In addition, the tractor unit 3 is preferably moreover provided with an electronic control unit (not shown in the figures) which is adapted to command the steering assembly and/or the vehicle engine apparatus according to the commands given manually by the vehicle driver.

In the example shown, in particular, the two ground-resting wheels 5 are preferably located on a pair of vertically pivoting or swivelling wheel-holding hubs, which are arranged on opposite sides of the vehicle midplane M, preferably in a substantially specular position with respect to the midplane M, and are attached to the bodywork or supporting frame 22 with the capability of rotating about respective, substantially vertical rotation axes.

The steering assembly, in turn, preferably comprises: two preferably electric- or hydraulic-type, servomotors (not visible in the figures) which are mechanically connected each to a respective wheel-holding hub, and are able to move/rotate, on command, this wheel-holding hub about the corresponding vertical rotation axis, so as to vary/control the angular position of the wheel-holding hub.

The vehicle engine apparatus, on the other hand, preferably comprises two electric motors 26 separate and independent from each other, each of which is adapted to drive into rotation a corresponding ground-resting wheel 5 in both directions.

More specifically, with reference to FIG. 3, each electric motor 26 is preferably attached cantilevered to a corresponding wheel-holding hub, preferably so as to be locally substantially coaxial to the corresponding ground-resting wheel 5, and is mechanically connected to the same ground-resting wheel 5 so as to drive it into rotation.

The electronic control unit (not shown) of tractor unit 3, in turn, is preferably adapted to command the two servomotors of the steering assembly according to the signals coming from the steering wheel present in the driver's cab 23, and/or to drive the engine apparatus of the vehicle, or rather the two electric motors 26, according to the signals coming from the throttle or accelerator present in the driver's cab 23.

With reference to FIG. 3, on the other hand, the swinging-arm linkage 6 preferably comprises a pair of swinging arms 27, which extend parallel to the vehicle vertical midplane M in a substantially specular position on opposite sides of the vehicle vertical midplane M and each aligned with a respective longitudinal prong or beam 11, and have one end hinged to the supporting bodywork 22 of the rear tractor unit 3 so as to rotate with respect to the latter parallel to the vertical midplane M. In addition, the two swinging arms 27 are rocker-arm pivoted to the rigid oblong frame 10 of the rack-supporting chassis 2, so as to rotate with respect to the latter while remaining always parallel to the vertical midplane M.

Preferably the swinging-arm linkage 6 additionally comprises a transversal connection element, which rigidly connects the two swinging arms 27 to each other and is adapted to keep the two swinging arms 27 always parallel and aligned with each other.

The lifting apparatus 7, on the other hand, preferably comprises two single or double-acting hydraulic or pneumatic cylinders 28, which are interposed between the swinging arms 27 of the swinging-arm linkage 6 and the rigid oblong frame 10, and are adapted to vary the tilt of the same swinging arms 27 with respect to the vertical, so that the height from the ground of the rear section of the rigid oblong frame 10 can be adjusted on command. Preferably the two hydraulic or pneumatic cylinders 28 are moreover accommodated each within a respective longitudinal prong or beam 11 of the rigid oblong frame 10.

Clearly, in a simplified embodiment, the lifting apparatus 7 preferably comprises only one hydraulic or pneumatic cylinder 28.

With reference to FIG. 3, the lifting apparatus 7 preferably also comprises two longitudinal connecting rods 29 that extending as a bridge between the two swinging arms 15 of the swinging-arm suspensions 14 and the two swinging arms 27 of the swinging-arm linkage 6, so as to force the two swinging arms 15 to rotate synchronously with the two swinging arms 27.

Moreover, the lifting apparatus 7 is preferably provided with a hydraulic or pneumatic distributor (not shown in the figures), which is able to control the flow of pressurised fluid to the hydraulic or pneumatic cylinders 17 and 28, so as to be able to lift and lower the rigid oblong frame 10 as desired; and of a second electronic control unit (not shown in the figures), which is preferably located aboard of the rear tractor unit 3, and is adapted to control the hydraulic or pneumatic distributor according to commands given manually by the vehicle driver, preferably via one or more control levers (not shown) located inside the driver's cab 23.

With reference to FIGS. 1, 2, 3, and 4, the self-propelled vehicle 1 is moreover provided with an electronic vehicle-load detecting apparatus, which is adapted to detect the geometric and/or structural features of the object being loaded into the rack-supporting chassis 2, i.e. of the ensemble formed by the glass-sheet supporting rack 100 and the glass sheets 101 or the like that may be placed thereon.

More in detail, the electronic vehicle-load detecting apparatus is adapted to reconstruct/determine a rough profile of the glass-sheet supporting rack 100 during loading and of any glass sheets 101 placed thereon, and then to determine, based on this profile, the geometric and/or structural features of the same glass-sheet supporting rack 100 and of the glass sheets 101 that may be placed thereon.

The electronic vehicle-load detecting apparatus preferably comprises: a number of distance sensors 30, which are suitably spaced along at least one and preferably both longitudinal beams 11 of rigid oblong frame 10, above the lying plane of the projecting blades or shelves 13, so as to face the inside of the central slit or compartment 12 of rigid oblong frame 10 at different points of the same central slit or compartment 12, and are adapted to detect in real time the distance between the sensor and the object immediately facing it; and a data processing unit 31 which is preferably located aboard the rear tractor unit 3, and is programmed/configured so as to process, in real time, the signals arriving from the various distance sensors 30 to determine certain structural and/or geometric features of the glass-sheet supporting rack 100 being inserted into the central slit or compartment 12 of the rack-supporting chassis 2.

More specifically, the data processing unit 31 is capable of reconstructing, based on the signals coming from the various distance sensors 30, a rough profile of the glass-sheet supporting rack 100 being loaded and of any glass sheets 101 placed thereon.

With reference to FIGS. 1, 2, 3, and 4, in particular the distance sensors 30 are preferably spaced out along the central slit or compartment 12 of the rack-supporting chassis 2, at gradually increasing distances from the front entrance of the same central slit or compartment 12, and are preferably also located at different heights from the ground, or rather at different heights from the projecting blades or shelves 13 of the longitudinal beams 11.

The data processing unit 31, in turn, is preferably programmed/configured to determine, based on the signals coming from the various distance sensors 30, the type of glass-sheet supporting rack 100 being loaded.

More specifically, the glass-sheet supporting racks 100 are manufactured in two versions. The first version (see FIGS. 1 and 4) has an L-shaped upper supporting framework 103 able to support glass sheets only on one side. The second version (not illustrated), on the other hand, has an A-shaped upper supporting framework able to support glass sheets on both sides.

By analysing the signals arriving from the distance sensors 30, the data processing unit 31 is capable of determining the type of superstructure present on the glass-sheet supporting rack 100 that is currently located in the central slit or compartment 12 of the rack-supporting chassis 2.

In addition, the data processing unit 31 is preferably also programmed/configured in so as to determine, based on signals arriving from the various distance sensors 30: the orientation of the glass-sheet supporting rack 100 being inserted into the central slit or compartment 12 of the rack-supporting chassis 2 (relevant for glass-sheet supporting racks 100 with L-shaped upper supporting framework 103); and/or the presence or absence of the glass sheets 101 on the glass-sheet supporting rack 100; and/or the arrangement of the glass sheets 101 on the glass-sheet supporting rack 100; and/or the number of sheets 101 placed onto the glass-sheet supporting rack 100.

Preferably the data processing unit 31 is moreover programmed/configured so as to determine, based on the signals coming from the distance sensors 30, which movable load-locking arms 18 of the rack-supporting chassis 2 are arranged in front of the glass sheet(s) 101 present on the glass-sheet supporting rack 100 and, thus, need to be moved towards the vehicle midplane M to lock/immobilise in place the glass sheet(s) 101 on the glass-sheet supporting rack 100.

Optionally, the electronic vehicle-load detecting apparatus, or rather the data processing unit 31, may also be programmed/configured so as to drive the hydraulic or pneumatic cylinders 21 of the various movable load-locking arms 18 of the rack-supporting chassis 2, so as to autonomously move the movable load-locking arms 18 to and from the glass sheets 101 present on the glass-sheet supporting rack 100.

Preferably the electronic vehicle-load detecting apparatus, or rather the data processing unit 31, is moreover electronically connected to the electronic control unit of tractor unit 3 and/or the electronic control unit of lifting apparatus 7, so as to take over from the driver, preferably automatically, the direct control of the self-propelled vehicle 1.

In other words, the electronic vehicle-load detecting apparatus, or rather the data processing unit 31, is able to control/command, autonomously and when needed, the electric motors 26 and the steering assembly of the tractor unit 3, and the lifting apparatus 7.

In addition, the electronic vehicle-load detecting apparatus, or rather the data processing unit 31, is preferably able to communicate to the vehicle driver, preferably via acoustic signals or images on a display placed in the driver's cab 23, the geometric/structural features of the object entering into the central slit or compartment 12 of the rack-supporting chassis 2.

With reference to FIGS. 1, 2, 3, and 4, in the example illustrated, in particular, the electronic vehicle-load detecting apparatus preferably has a plurality of pairs of distance sensors 3, which are formed by two distance sensors 30 located on the lateral side of the longitudinal beam 11 one substantially vertically aligned with the other, and which are placed along the central slit or compartment 12 of the rack-supporting chassis 2 at increasing distances from the front entrance of the central slit or compartment 12.

More in detail, the electronic vehicle-load detecting apparatus preferably comprises: a first pair of distance sensors 30 that is located on the lateral side of a first longitudinal beam 11, substantially at the entrance of the central slit or compartment 12 of the rack-supporting chassis 2; and a second pair of distance sensors 30 that is located on the lateral side of the second longitudinal beam 11, approximately halfway along the length of the central slit or compartment 12 of the rack-supporting chassis 2.

Optionally, the electronic vehicle-load detecting apparatus additionally comprises a third pair of distance sensors 30 that is located on the lateral side of the second longitudinal beam 11, roughly three-quarters along the length of the central slit or compartment 12 of the rack-supporting chassis 2.

Preferably, finally the distance sensors 30 are ultrasonic distance sensors of known type.

With reference to FIGS. 3 and 4, preferably the electronic vehicle-load detecting apparatus moreover comprises: one or more presence sensors, which are located on one or both of the longitudinal shelves 13 of the rack-supporting chassis 2, and are adapted to detect the presence of the base 102 of the glass-sheet supporting rack 100 at one or more points in the central slit or compartment 12 of the rack-supporting chassis 2; and/or one or more speed sensors capable of determining, in real time, the moving speed of the self-propelled vehicle 1.

The data processing unit 31, in addition, is preferably connected also to said one or more presence sensors and/or said one or more speed sensors, and is preferably programmed/configured so as also to determine/estimate, based on the signals coming from said presence sensor(s) and said speed sensor(s), the position of the glass-sheet supporting rack 100 within the central slit or compartment 12 of the rack-supporting chassis 2 and/or the overall length of the glass-sheet supporting rack 100.

More specifically, the electronic vehicle-load detecting apparatus preferably includes: a front presence sensor 32 that is placed on one of the longitudinal blades or shelves 13 of the rack-supporting chassis 2, substantially at the front entrance of the central slit or compartment 12 of the rack-supporting chassis 2; and/or a rear presence sensor 33 that is located on one of the longitudinal blades or shelves 13 of the rack-supporting chassis 2, at a short distance from the back of the central slit or compartment 12 of the rack-supporting chassis 2.

The front presence sensor 32 is adapted to detect the presence of the base 102 of the glass-sheet supporting rack 100 at the entrance to the central slit or compartment 12. The rear presence sensor 33, on the other hand, is adapted to detect the presence of the base 102 of the glass-sheet supporting rack 100 near the back of the central slit or compartment 12 of the rack-supporting chassis 2.

Due to the signals coming from the presence sensors 32 and 33, the data processing unit 31 is then able to determine when the glass-sheet supporting rack 100 enters the central slit or compartment 12 of the rack-supporting chassis 2, and when the glass-sheet supporting rack 100 approaches the back of the central slit or compartment 12 of the rack-supporting chassis 2.

In the example shown, in particular, the presence sensors 32 and 33 are preferably photocells of known type.

The speed sensor(s), on the other hand, are preferably encoders or other type of angular position transducers, suitably coupled to the electric motors 26 or directly to the ground-resting wheels 4 and/or 5.

In addition, the data processing unit 31 is preferably also programmed/configured so as to determine, based on the signals coming from the distance sensors 30 and the presence sensors 32 and 33, whether the glass sheet(s) 101 present on the glass-sheet supporting rack 100 protrude cantilevered towards the tractor unit 3 and/or cantilevered from the entrance of the central slit or compartment 12 of the rack-supporting chassis 2, when the glass-sheet supporting rack 100 is fully inserted in the central slit or compartment 12.

With reference to FIGS. 3 and 4, preferably the electronic vehicle-load detecting apparatus is finally provided with a series of proximity sensors 35 that are placed on the distal ends of the various movable load-locking arms 18, or rather on the plate-like heads 20 of the various movable load-locking arms 18, and are adapted to detect when the same distal ends are abutting against the glass sheets 101; and/or with a series of position sensors 36 that are placed on the movable load-locking arms 18 and are adapted to determine when the movable load-locking arms 18 are fully open, i.e. when the movable load-locking arms 18 are substantially vertical and arrange the distal ends at the maximum distance from the vehicle midplane M.

The data processing unit 31, in addition, is preferably programmed/configured to determine, based on signals coming arriving the proximity sensors 35 and the position sensors 36, whether the right movable load-locking arms 18 have extended/moved up to bring their distal ends correctly in abutment on the glass sheets 101 present on the glass-sheet supporting rack 100. Finally, if this is not the case, the data processing unit 31 is preferably moreover programmed/configured so as to prevent/inhibit the movement of the self-propelled vehicle 1 and/or to autonomously reduce the moving speed of the self-propelled vehicle 1, for example during changes in the vehicle's direction.

In other words, the electronic vehicle-load detecting apparatus, or rather the data processing unit 31, is preferably capable of limiting the maximum speed of the vehicle according to the features of the object present in the central slit or compartment 12 of the rack-supporting chassis 2.

General operation of the self-propelled vehicle 1 is easily inferable from what disclosed above.

The electronic vehicle-load detecting apparatus, in turn, is able to reconstruct, without the intervention of the vehicle driver and while the glass-sheet supporting rack 100 is being forked by the self-propelled vehicle 1, a rough profile of the glass-sheet supporting rack 100 being loaded and of any glass sheets 101 placed thereon.

Based on this profile, the electronic vehicle-load detecting apparatus is moreover able to determine the structural and/or geometric features of the object accommodated into the central slit or compartment 12 of the rack-supporting chassis 2, i.e. of the glass-sheet supporting rack 100 and of any glass sheets 101 resting on it, and to adopt a series of countermeasures aimed at minimising the risks related to the handling of the glass-sheet supporting rack 100.

For example, during loading of the glass-sheet supporting rack 100, the electronic vehicle-load detecting apparatus, or rather the data processing unit 31, may automatically reduce the forward speed of the self-propelled vehicle 1 when it detects/establishes that the base 102 of the glass-sheet supporting rack 100 has engaged the entrance of the central slit or compartment 12 of the rack-supporting chassis 2, or when the distance of the base 102 of the glass-sheet supporting rack 100 from the back of the central slit or compartment 12 decreases below a predetermined threshold limit (e.g. 40 cm).

Additionally or alternatively, in the case of a glass-sheet supporting rack 100 with an L-shaped superstructure and/or in the case of an asymmetrical distribution of the glass sheets 101 on the glass-sheet supporting rack 100, the electronic vehicle-load detecting apparatus, or rather the data processing unit 31, may automatically reduce the speed of travel of a bend to minimise the risks of overturning of the self-propelled vehicle 1.

In absence of glass sheets 101 on the glass-sheet supporting rack 100 entering or momentarily accommodated into the central slit or compartment 12 of the rack-supporting chassis 2, the data processing unit 31 may instead allow/authorise a higher moving speed of the self-propelled vehicle 1 than that permitted when fully loaded.

Finally, the electronic vehicle-load detecting apparatus can replace the driver of the vehicle in activating the individual movable load-locking arms 18 of the rack-supporting chassis 2, so as to carry out the locking in place of the glass sheets 101 present on the glass-sheet supporting rack 100 in total autonomy.

The advantages related to the presence of the electronic vehicle-load detecting apparatus are remarkable.

The electronic vehicle-load detecting apparatus relieves the vehicle driver of a whole series of tasks and allows him to focus his/her attention solely on driving the self-propelled vehicle 1 with the resulting increased safety.

In addition, the electronic vehicle-load detecting apparatus is capable of signalling to the driver of the self-propelled vehicle 1 if one or more glass sheets 101 protrude cantilevered from the front of the rack-supporting chassis 2, further simplifying the driving of the self-propelled vehicle 1.

It is finally clear that modifications and variations may be made to the self-propelled vehicle 1 described above without however departing from the scope of the present invention.

For example, the steering wheel and the throttle or accelerator in the driver's cab 23 may be replaced by a joystick or the like.

In a less sophisticated embodiment, moreover, the steering assembly of the rear tractor unit 3 may comprise, in place of the two servomotors, a hydraulic actuator that receives pressurised oil from a conventional power steering unit operated directly by the steering wheel, and is able to rotate the two wheel-holding hubs about their corresponding vertical rotation axes.

The invention claimed is:

1. A self-propelled vehicle (1) for handling glass-sheet supporting racks (100) of the type comprising: a front rack-supporting chassis (2) provided with a substantially U-shaped rigid oblong frame (10) which has two longitudinal beams (11) that extend horizontally and parallel to the longitudinal axis of the vehicle (L), on opposite sides of the vehicle midplane (M), and that delimit a large central slit or compartment (12) open at the front and dimensioned to accommodate a glass-sheet supporting rack (100); a rear tractor unit (3) which is firmly connected to the front rack-supporting chassis (2) via mechanical means (6) allowing the rack-supporting chassis (2) to move vertically with respect to the tractor unit (3); and a lifting apparatus (7) which is capable of varying on command the height from the ground of the rigid oblong frame (10) of the rack-supporting chassis (2);

the self-propelled vehicle (1) being characterised by comprising an electronic vehicle-load detecting apparatus which is adapted to detect the geometric and/or structural features of the glass-sheet supporting rack (100) during insertion into the central slit or compartment (12) of the rack-supporting chassis (2).

2. Self-propelled vehicle according to claim 1, wherein said electronic vehicle-load detecting apparatus is adapted to reconstruct/determine a rough profile of the glass-sheet supporting rack (100) during loading and of any glass sheets or the like (101) placed thereon, and then to determine, based on said profile, the geometric and/or structural features of the same glass-sheet supporting rack (100) and of the glass sheets (101) placed thereon.

3. Self-propelled vehicle according to claim 1, wherein said electronic vehicle-load detecting apparatus comprises: a series of distance sensors (30) that are spaced along at least one of the longitudinal beams (11) so as to face the inside of the central slit or compartment (12) of the oblong rigid frame (10) in different points of said central slit or compartment (12), and are adapted to detect the distance between the sensor and the object immediately facing it; and a data processing unit (31) which is programmed/configured so as to process the signals arriving from the various distance sensors (30) to determine one or more structural and/or geometric features of the glass-sheet supporting rack (100) that takes up the central slit or compartment (12) of the rack-supporting chassis (2).

4. Self-propelled vehicle according to claim 3, wherein said distance sensors (30) are located at different heights from the ground.

5. Self-propelled vehicle according to claim 3, wherein said distance sensors (30) are located at increasing distances from the front entrance of the central slit or compartment (12) of the rack-supporting chassis (2).

6. Self-propelled vehicle according to claim 3, wherein said electronic vehicle-load detecting apparatus is provided with a plurality of pairs of distance sensors (30), which are formed by two distance sensors (30) located on the lateral side of the longitudinal beam (11) one substantially vertically aligned with the other, and which are placed along the central slit or compartment (12) of the rack-supporting chassis (2) at increasing distances from the front entrance of said central slit or compartment (12).

7. Self-propelled vehicle according to claim 3, wherein said distance sensors (30) are ultrasonic distance sensors.

8. Self-propelled vehicle according to claim 1, wherein both longitudinal beams (11) are provided with at least one protruding longitudinal shelf (13) that extends cantilevered inside the central slit or compartment (12) while remaining substantially parallel to the ground, and is adapted to slide underneath the lateral side of the base (102) of the glass-sheet supporting rack (100).

9. Self-propelled vehicle according to claim 8, wherein said electronic vehicle-load detecting apparatus moreover comprises: one or more presence sensors (32, 33) that are located on at least one of said protruding longitudinal shelves (13), and are adapted to detect the presence of the base (102) of the glass-sheet supporting rack (100) in one or more points of the central slit or compartment (12) of the rack-supporting chassis (2); and/or one or more speed sensors adapted to determine the moving speed of the self-propelled vehicle (1); the data processing unit (31) being also connected to said one or more presence sensors (32) and/or to said one or more speed sensors.

10. Self-propelled vehicle according to claim 9, wherein said electronic vehicle-load detecting apparatus comprises: a front presence sensor (32) that is placed on one of the protruding longitudinal shelves (13), substantially at the front entrance of the central slit or compartment (12) of the rack-supporting chassis (2); and/or a rear presence sensor (33) that is located on one of the protruding longitudinal shelves (13), at a predetermined distance from the back of the central slit or compartment (12) of the rack-supporting chassis (2).

11. Self-propelled vehicle according to claim 1, wherein the rear tractor unit (3) is provided with ground-resting driving wheels (5) and with an engine apparatus (26) that is adapted to drive into rotation said ground-resting driving wheels (5); the electronic vehicle-load detecting apparatus being adapted to command said engine apparatus (29).

12. Self-propelled vehicle according to claim 1, wherein the rear tractor unit (3) is provided with ground-resting steering wheels (5) and with a steering assembly that controls the orientation of said ground-resting steering wheels (5); the electronic vehicle-load detecting apparatus being adapted to command said steering assembly.

13. Self-propelled vehicle according to claim 1, wherein said rear tractor unit (3) is provided with at least two rear ground-resting wheels (5), which are driving and steering wheels and are arranged on opposite sides of the vertical midplane (M) of the vehicle.

14. Self-propelled vehicle according to claim 1, wherein said front rack-supporting chassis (2) is provided with at least two front ground-resting wheels (4) that are idle and are located on the two longitudinal beams (11) of the oblong rigid frame (10), on opposite sides of the vertical midplane (M) of the vehicle.

15. Self-propelled vehicle according to claim 14, wherein the front ground-resting wheels (4) are located substantially at the distal ends of said longitudinal beams (11).

16. Self-propelled vehicle according to claim 1, wherein said electronic vehicle-load detecting apparatus limits the maximum speed of the vehicle as a function of the features of the vehicle-load.

* * * * *